July 12, 1949.　　　　　H. L. CLARK　　　　　2,476,025
PRECISION FREQUENCY METER
Filed June 9, 1945　　　　　　　　　　　　　　　3 Sheets-Sheet 1

Inventor:
Howard L. Clark,
by [signature]
His Attorney.

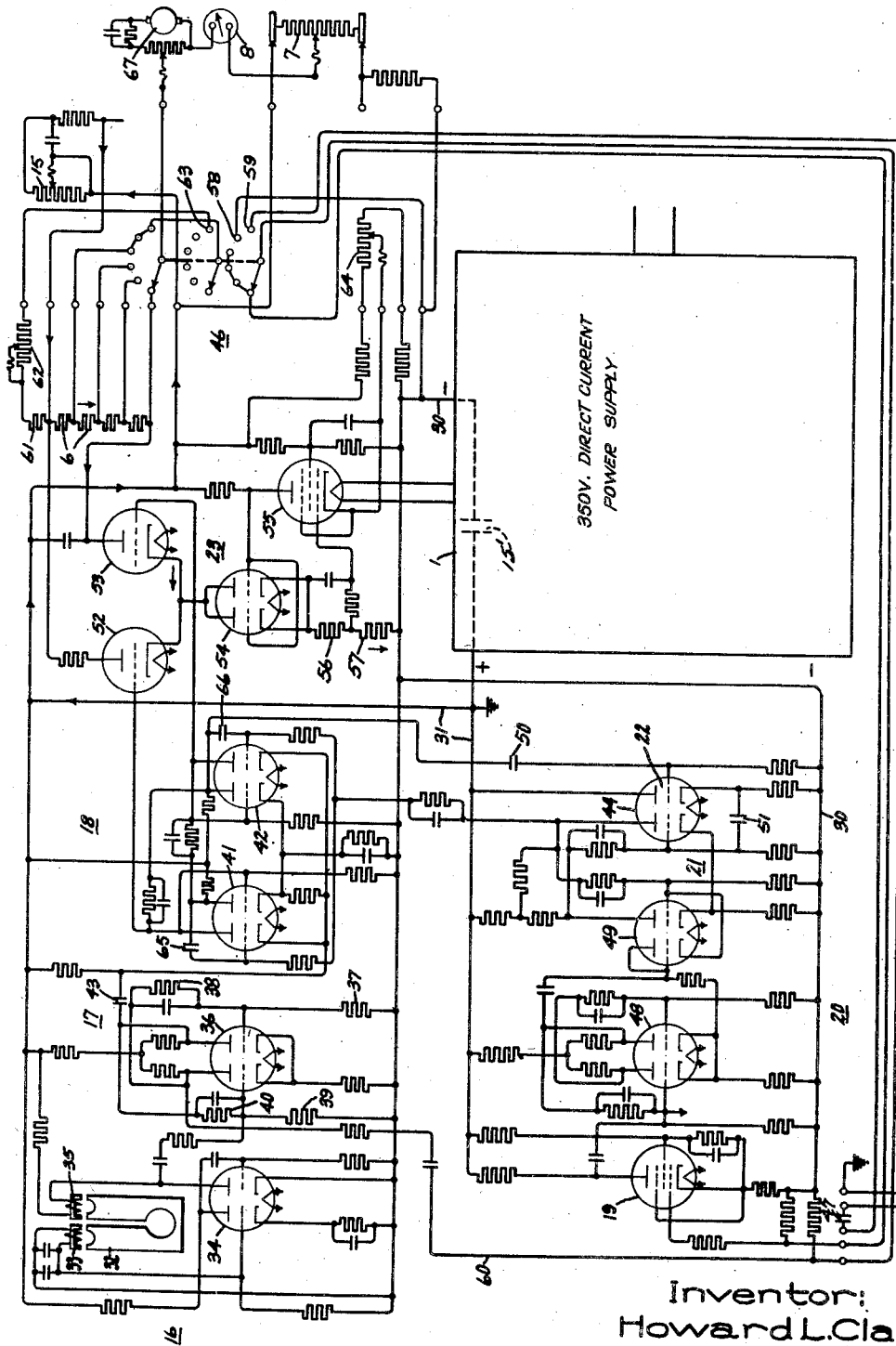

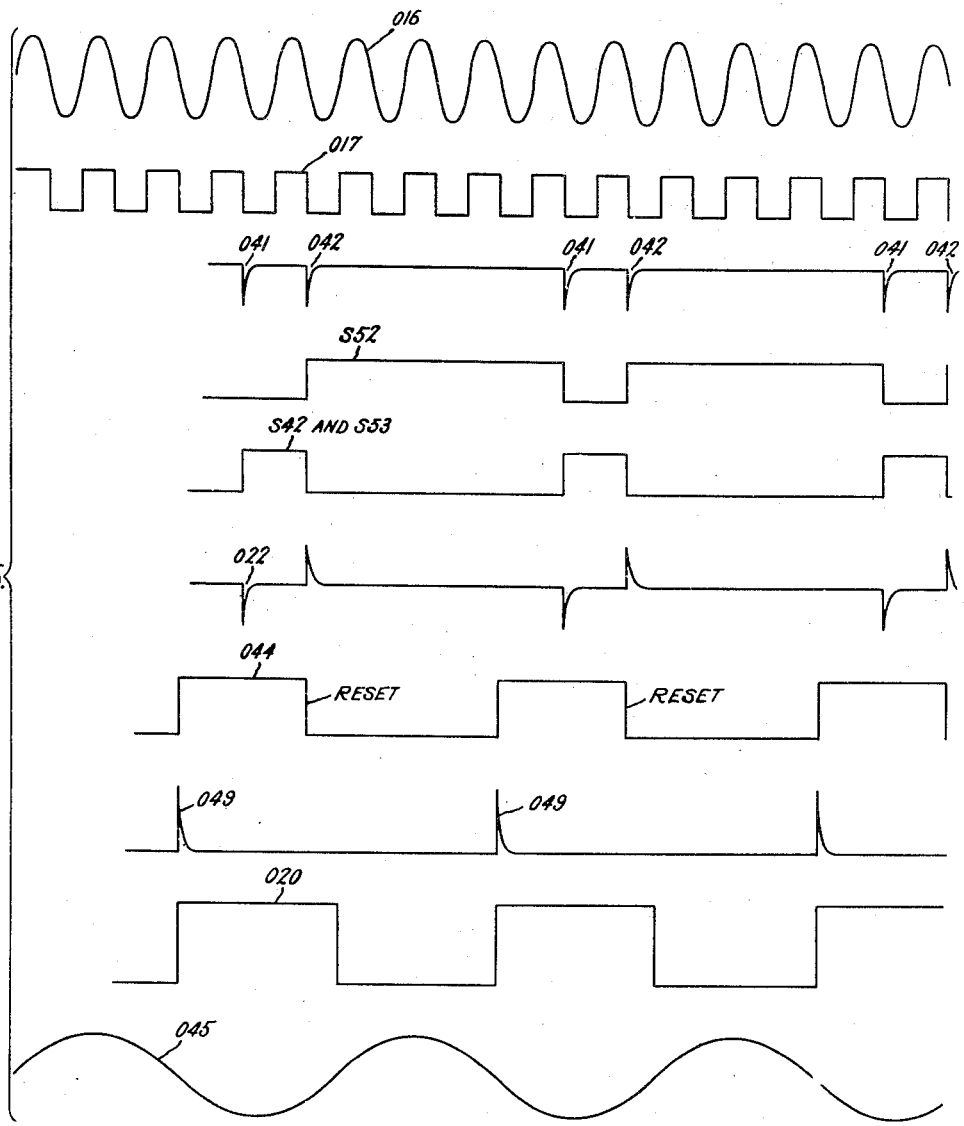

Patented July 12, 1949

2,476,025

UNITED STATES PATENT OFFICE 2,476,025

PRECISION FREQUENCY METER

Howard L. Clark, Ballston Lake, N. Y., assignor to General Electric Company, a corporation of New York Application June 9, 1945, Serial No. 598,606

7 Claims. (Cl. 175—368)

1

My invention relates to frequency measuring apparatus and its object is to provide apparatus of this character which has high precision and is useful over a wide range of the frequency and voltage of the signal source.

According to my invention a constant direct current is impressed on a suitable measuring circuit for equal time periods for each cycle of the frequency to be measured. The average current or the resulting average voltage thus impressed on the measuring circuit is proportional to such frequency and can be measured in terms of frequency or speed. The incoming signal frequency to be measured may be in the form of an alternating current voltage which should be essentially free from harmonics and may be generated, for example, by a tachometer generator for measuring speeds from zero up to 30,000 revolutions per minute. Several frequency measuring ranges are provided; for example, from zero to 100, from zero to 200, from zero to 500, and from zero to 1,000 cycles per second. The voltage of the signal frequency may vary from 5 to 150 volts for example, without interfering with the accuracy of the measurement. For controlling the time intervals during which the constant current is supplied to the measuring circuit, I employ a high accuracy tuning fork oscillator. Electronic circuits are employed to obtain the constant current and in the timing control. The apparatus when properly calibrated has an accuracy within 0.2 of one per cent of full scale calibration. Instruments for indicating, printing, and transmitting the measurement may be used with the apparatus, and several such instruments may be supplied from the apparatus simultaneously.

My invention is not limited to the above-mentioned specifications but they illustrate practicable specifications that can be incorporated in a single measuring system embodying my invention.

Figure 1:
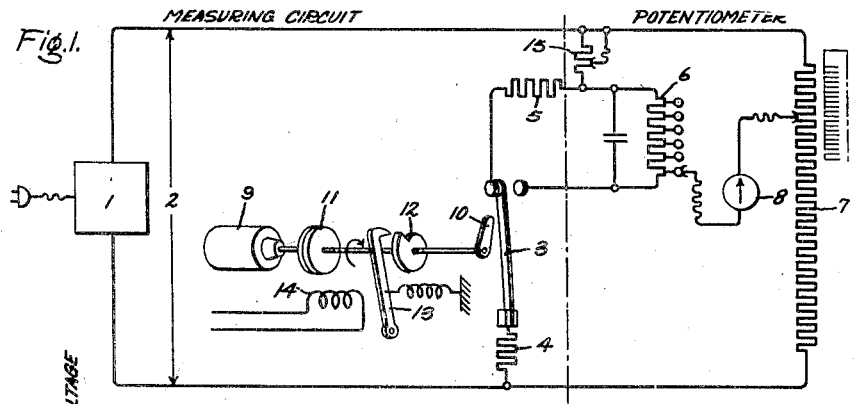
Figure 2:
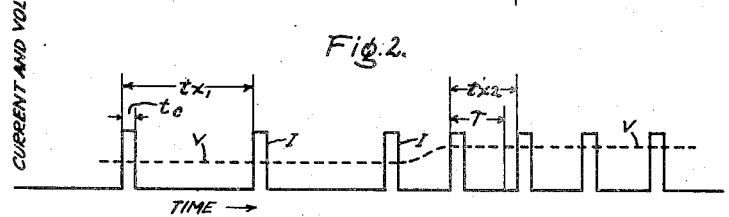
Figure 3:
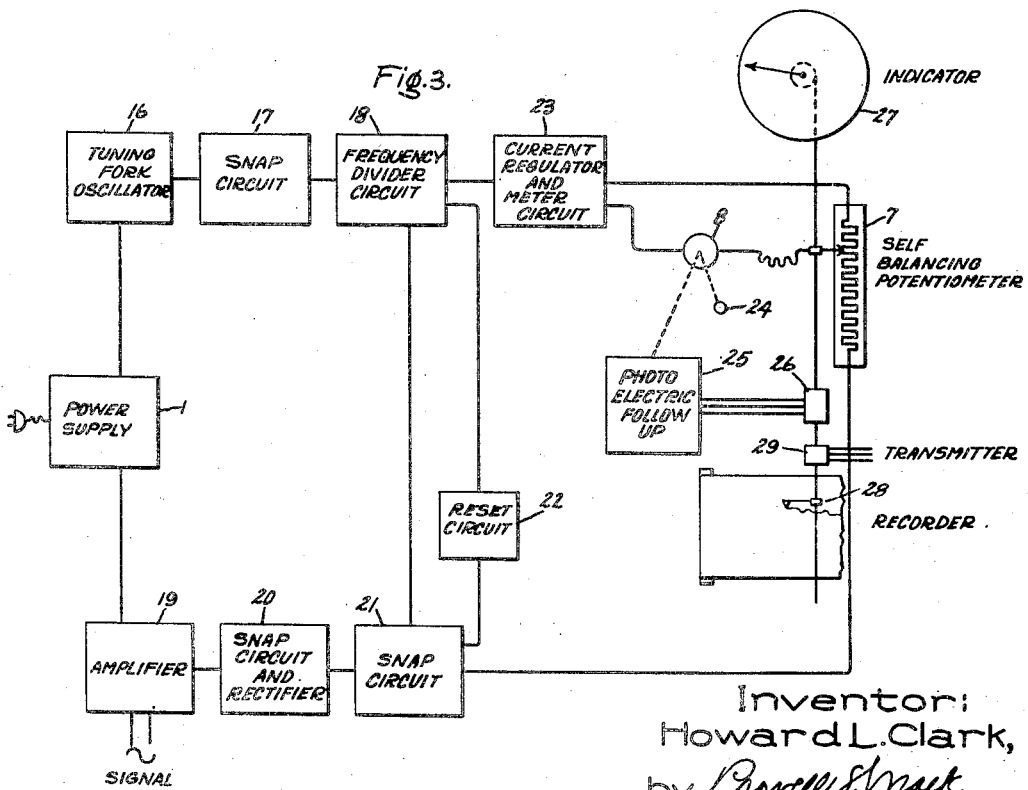

The features of my invention which are believed to be novel and patentable will be pointed out in the claims appended hereto. For a better understanding of my invention, reference is made in the following description to the accompanying drawings in which Fig. 1 is a schematic diagram which will be referred to in explaining the theory of operation of the invention; Fig. 2 is a diagram representing timing intervals involved in the theory of operation of my invention; Fig. 3 is a block diagram of the several parts of the apparatus used in carrying out my invention; Fig. 4 is a diagram of the electronic measuring circuit and associated apparatus; and Fig. 5 shows curves of coordinated voltage and current values at different points in the electronic circuits.

The measuring circuit is essentially electronic and has the frictionless, high speed operating characteristics of electron circuits, but it may be helpful to an understanding of the invention first to explain certain basic functions of the measuring circuit as they might be performed mechanically at a much slower rate than electronically and this is one of the purposes of Fig. 1. Fig. 1 also schematically represents the two major components of the frequency measuring apparatus comprising; first, the measuring circuit which delivers an average direct current which is proportional to the frequency to be measured; and second, the potentiometer and associated apparatus which is used to obtain the measurement of the average direct current voltage in terms of frequency or speed.

In Fig. 1 at 1, I have represented a power supply which produces a constant direct current voltage across the lines 2. Three (3) represents switching mechanism which may alternately close a circuit across lines 2 through resistances 4 and 5 or through 4 and 6. Also connected across the lines 2 is a potentiometer resistance 7, and a measuring instrument 8 is connected between the slider of the potentiometer and the switch terminal of resistance 6. At 9 there is represented a constant speed motor device which may drive a cam arm 10 for operating switch 3. This drive is through a slip friction clutch 11, and a latch member 12 is provided on the shaft between the cam member 10 and clutch 11 in order that cam 10 may be locked from rotation by a cooperating magnetic latch member 13 when the latter is not withdrawn from latching position by a coil 14.

The switch 3 is biased to the position shown so that the circuit established thereby is normally through resistances 4 and 5, but when cam 10 moves past the switch, a circuit is established through resistances 4 and 6 for a definite time interval during each revolution of cam 10 depending upon the speed of motor 9. Assume that signal impulses proportional to the frequency or speed to be measured and sufficient in strength to withdraw latching member 13 from latching position are impressed on coil 14. Member 13 is normally held in latching position holding cam 10 from rotation in an angular position where the switch 3 is closed to the left. As represented, a signal impulse has just energized coil 14 and withdrawn latch 13, and the cam 10 has started to rotate at constant speed. It will shortly move switch 3 to the right momentarily permitting current to flow through the resistance 6 and influencing the instrument 8. When the rotating part 12 of the latch comes opposite part 13, the signal impulse will be over and the cam 10 will be held from rotation until the next signal impulse. The speed of rotation of cam 10 must be such that it can make a complete revolution in a time not greater than the shortest time between the impulses to be measured; otherwise, some signaling impulses will be lost. It is now seen that for each signaling impulse, switch 3 is closed to the right for a definite time interval during which time the constant voltage of source 1 causes constant current to flow through resistance circuits 6 and 4, and the point of connection of the instrument 8 to this circuit will thus have average voltage proportional to the average current and the signal impulse rate. By adjusting the other connection of the instrument 8 along the potentiometer resistance 7, a point at the same voltage will be found where the instrument 8 reads zero. The potentiometer has been previously calibrated so that the frequency may then be read off from the potentiometer scale.

In Fig. 2 the ordinates represent current flow through the circuit of resistances 6 and 4 and also the voltage of the point where instrument 8 is connected to this circuit, and the abscissas represent time. Then the square waves of current I may represent the current flow through the circuit of resistances 6 and 4 when switch 3 is closed to the right during time intervals $tc$ which are constant. $tx_1$ represents the time between signal impulses at the left in Fig. 2, and $tx_2$ the time between signal impulses at the right in Fig. 2 where the impulse rate has doubled. The dotted line curve V may then represent the average current through resistance 6 and the average voltage which will be impressed upon the left terminal of the instrument 8, and it is seen that this is proportional to the signal impulse rate. It is evident that the rate of revolution of motor 9 must be such that cam 10 can make a complete revolution in a time not greater and preferably less than the time between the fastest impulses to be measured. The time for a complete revolution of cam 10 may, for example, be represented by T, Fig. 2, which is less than $tx_2$. If T were longer than the impulse time $tx_2$, for example, $tx_2+tc$, every other impulse at the $tx_2$ rate would be lost, and V would only be proportional to the impulse rate when the latter is not greater than the rate of revolution of motor 9. The adjustable resistance represented at 15 in Fig. 1 indicates a zero setting adjustment. The point of connection between resistance 6 and instrument 8 may be changed as indicated for the purpose of adjusting the apparatus for different frequency impulse measurement ranges. The voltage V, Fig. 2, is equal to $$R_6 I \frac{tc}{tx}$$

where $R_6$ represents the value of the resistance included at 6, I the current flow therethrough, and $tx$ the time between impulses. Figs. 1 and 2 thus represent certain of the basic principles embodied in my invention. Figs. 1 and 2 serve to illustrate these principles, but do not include all features of the invention or disclose all operating principles embodied in the preferred apparatus illustrated in Figs. 3 and 4 and more fully described hereinafter.

In practice the timing device represented at 9 in Fig. 1 is a high accuracy tuning fork, and the switching mechanism at 3 and the control parts generally represented by 10 to 14 in Fig. 1 are electronic devices and have the high speed operating characteristics of such devices. A block diagram of the apparatus is represented in Fig. 3 and a wiring diagram of the important parts is shown in Fig. 4.

In the block diagram, Fig. 3, the constant voltage direct current power supply is represented at 1. Phantom capacitor 15' represents the low A.-C. output impedance of the power supply, which may be the capacitance of a filter or its equivalent commonly used with D.-C. power supplies to reduce A.-C. ripple voltage. Due to this low A.-C. impedance, the two power supply terminals are maintained at substantially the same A.-C. potential, although they have a D.-C. potential difference of 350 volts. Sixteen (16) represents a high accuracy tuning fork oscillator, which supplies a very constant standard frequency alternating current voltage and corresponds in some respects to the motor 9, Fig. 1. This voltage is changed to a square wave form by a snap circuit 17. Negative triggering pulses at the rate of one per cycle of the standard frequency source are produced by differentiation of the square wave, and one pulse of uniform duration for each cycle of the signal being measured is furnished by a frequency divider 18.

The signal frequency to be measured is amplified at 19 and converted to pulses by a snap circuit and rectifier 20 which sends pulses, preferably one per cycle of the signal frequency and of one polarity only to a snap circuit 21. The snap circuit 21 furnishes a square wave to the frequency divider circuit. The snap circuit 21 also receives impulses through a reset circuit 22 from the frequency divider circuit 18 at the end of each pulse of the frequency divider circuit.

The frequency divider 18, the reset circuit 22, and snap circuit 21 correspond in some respects to the clutch 11 and latch mechanism 12—13 of Fig. 1. A current regulator and meter circuit 23 passes constant current through measuring resistors during the pulses from the frequency divider 18 and corresponds in some respects to switch 3, Fig. 1. The instrument 8, which is a mirror galvanometer, and the potentiometer 7 of Fig. 1 are represented in the output of the current regulator and metering circuit 23 and comprise portions of a self-balancing potentiometer which includes a light source 24, a photoelectric follow-up 25, controlling a reversible motor 26 for adjusting the slider of the potentiometer resistance 7. The motor 26 may operate an indicator 27, a recorder 28, and a transmitter 29 for transmitting the measurement to a remote point.

In order to illustrate a practicable example, certain values will be mentioned in the description which follows. However, it is to be understood that the invention is not limited to such values. In Fig. 4 the power supply is represented by the boxed rectangle 1 and produces 350 volts direct current at its output terminals 30—31; the latter terminal is positive and is grounded. Conventional means are also provided to supply filament voltages to the vacuum tubes. The tuning fork oscillator 16 produces a very constant frequency of 3000 cycles per second and comprises a tuning fork 32 having a pickup coil 33 connected to the grid of a two-stage vacuum tube amplifier 34, the output plate terminal of which is connected through a drive coil 35 of the tuning fork 32 to the positive side of the power supply. Any slight vibration will start the oscillator into operation and it will be kept in operation at its natural frequency, supplying an alternating current potential of the form represented in curve O16, Fig. 5, to the grid of the first stage of a double vacuum tube 36 which, together with its circuit elements, comprises the snap circuit 17. The output of the oscillator 16 is applied to the left grid of tube 36 through a condenser and a resistance. When this grid is driven negative, its corresponding plate will go positive, driving the right grid of tube 36 positive through a voltage divider 37 and 38. This allows the right section of tube 36 to pass current and drives its corresponding plate negative, which then holds the left grid negative through a voltage divider 39 and 40. The reverse operation takes place when the left grid is driven positive; that is, when the left plate and right grid go negative, right plate goes positive and holds the left grid positive. This transposition of first one section of tube 36 passing current to the other section passing current is very rapid; hence, the name "snap circuit." The output from the right plate of tube 36 is thus essentially a square wave at the frequency of the oscillator 16 as represented by O17, Fig. 5. This square wave is differentiated by passage through capacitor 43 to provide triggering pulses to frequency divider circuit 18. Thus, in effect, oscillator 16 and snap circuit 17 make up a source of triggering pulses having a very precise and constant repetition rate.

The frequency divider circuit 18 is composed of vacuum tubes 41 and 42. Sharp impulses of alternating polarity are delivered to the cathodes of these tubes from the snap circuit 17 through capacitor 43. The bias voltage of the left grid of tube 41 and the right grid of tube 42 is established by the voltage of the left plate of a tube 44 and the state of operation of snap circuit 21 of which this section of tube 44 is a part. For the purpose of explanation let it be assumed that these last-mentioned grids are being held positive by the snap circuit 21. The frequency divider circuit is then conditioned to be responsive to triggering pulses from snap circuit 17. The cathodes of tubes 41 and 42 are biased several volts positive with respect to their corresponding grids and are normally idle, and thus any positive impulse through condenser 43 to these cathodes will have no effect upon the circuit 18. However, a negative impulse from 43 to the cathodes of tubes 41 and 42 will pull their voltages down so that one of the outer sections of these tubes will pass current momentarily. The reason why only one and which one thus passes currents will appear presently.

Assume then that the left section of tube 41 thus passes current. The resulting negative impulse on the grid of the right section of tube 41 will cause its plate to go positive, driving the left grid of tube 42 positive. This will cause the left plate of tube 42 to go negative, driving the right grid of tube 42 negative.

During this time the left grid of tube 41 is driven positive through capacitor 65 from the right plate of tube 41, thus assisting the left section of tube 41 to carry current. At the same time the right grid of 42 is driven negative by the left plate of tube 42 through capacitor 66. Thus even though a negative impulse is applied to the cathode of the right section of tube 42 this tube will not pass current due to the fact that its grid has been driven more negative. After the action described above has occurred, the right plate of tube 41 will be relatively positive and the left plate of tube 42 will be relatively negative. The next impulse from condenser 43 will be positive and have no effect on the circuit. The next negative impulse which will come after a complete cycle of the tuning fork oscillator 16 will cause the right section of tube 42 to pass current and will pull the left grid of tube 42 negative, which will drive the left plate of this tube positive and snap the circuit. The negative signal voltage impulses which will thus appear on the outer plates of tubes 41 and 42 are represented at O41 and O42 in Fig. 5, the tubes alternating in producing these impulses. The actual voltages of these outer plates are the sum of such negative pulses and voltages from the inner plates of tubes 41 and 42, and are approximately rectangular in waveform as illustrated at O42, Fig. 5.

Since tubes 41 and 42 comprise a snap circuit which transfers its position only on negative impulses and since two negative impulses are required for one complete operation of circuit 18, this circuit functions as a frequency divider. If the outer grids of tubes 41 and 42 are held negative by the left plate of tube 44 of snap circuit 21, the frequency divider circuit 18 is non-responsive to triggering pulses from snap circuit 17 and the impulses O41 and O42 are not produced, which accounts for the omission of certain such impulses in Fig. 5.

The signal frequency to be measured comes in at the terminals marked 45, Fig. 4, and for the position of range selector switch 46 shown is impressed between the cathode and grid of amplifier 19, through grid and cathode resistors and through a condenser 47 which blocks any direct current component in the signal voltages. Although the cathode of amplifier tube 19 has a negative D.-C. potential, it is substantially at A.-C. ground potential due to the output capacitance of the power supply which presents a low A.-C. impedance to ground. Since the A.-C. impedance of the power supply is negligible compared to the impedance of the plate resistor, there is substantially no A.-C. voltage at the signal frequency across the power supply. The signal frequency is represented at O45, Fig. 5, and should be relatively free from harmonics since a reversal of current caused by a harmonic might produce a false reading. After amplification the signal frequency is fed to snap circuit 20 including a double tube 48. This snap circuit is similar to snap circuit 17 and serves merely to convert the amplified signal frequency into a square wave O20, Fig. 5. The output of tube 48 is differentiated by passage through a coupling capacitor and fed to a tube 49 the left section of which comprises a rectifier which passes positive pulses only, and thus has a cathode output represented by the positive pulses O49, Fig. 5, at a frequency of one cycle of the signal frequency O45.

The snap circuit 21 is composed of the right section of tube 49 and the left section of the tube 44. The right grid of tube 49 is driven positive by the rectifier impulses O49, thus driving the potential of its plate negative. This drives the potential of the left grid of tube 44 negative, allowing its plate to go positive as represented by the prolonged square wave impulses of curve O44, Fig. 5, which is the outer grid bias control of the tubes 41 and 42 of the frequency divider 18. The right-hand section of tube 44 comprises the reset circuit 22 and has its grid connected through a condenser 50 to the left plate of tube 42 of the frequency divider so that as this plate alternates in polarity, voltage pulses are applied to the grid of the reset circuit. Thus, S42, Fig. 5, may represent the current flow through the left plate of tube 42 and O22 the voltage on the reset circuit 22 grid. Upon the occurrence of the positive pulse on this reset circuit grid, the reset tube section will pass current, drawing its cathode positive, and a positive impulse will be transmitted through condenser coupling 51 to the left grid or snap circuit grid of tube 44, which section will pass current, causing the corresponding plate to go negative at the point marked "Reset" on curve O44, Fig. 5. This interrupts the prolonged impulses of curve O44 and conditions the frequency divider 18 to be non-responsive to triggering pulses and resets the snap circuit 21 which will then be ready to receive the next positive impulse O49 from the rectifier circuit left half of tube 49.

It is thus seen that the left side of the square waves O44 occurs in response to the signal frequency to be measured and permits operation of the frequency divider 18 in response to the next two sharp negative pulses from 17 through 43 allowing the frequency divider circuit to produce pulses O41 and O42, while the right side of square waves O44 occurs in response to the second impulse O42 of the frequency divider operating through the reset circuit 22 to cut off or terminate square wave O44, conditioning the frequency divider to be non-responsive to triggering pulses and at the same time resetting snap circuit 21 preparing it for reception of the next impulse O49 coming through snap circuit and rectifier 20. The lengths of the tops of square waves O44 are thus not necessarily equal but have a duration depending upon the existing phase relation of the standard frequency wave O16 and the measurement frequency wave O45. Compared to the sharp waveform triggering pulses O41, square waves O44 are prolonged impulses. In effect, amplifier 19 and snap circuit and rectifier 20 are means to provide cyclicly recurring pulses having a repetition rate regulated by the measured frequency, and snap circuit 21 is a bias control circuit which is set by each such pulse for conditioning the frequency divider circuit to be responsive to triggering pulses and is reset by circuit 22 for conditioning the frequency divider circuit to be non-responsive to triggering pulses upon the termination of each rectangular waveform pulse O44, as has been explained.

The current regulator and meter circuit 23 is composed of tubes 52, 53, 54, and 55 along with resistances 6 and the connections shown. The grid voltage of tubes 52 and 53 is controlled by the frequency divider circuit 18. Thus the grid of tube 52 is coupled to the right grid of tube 41, and the grid of tube 53 is coupled to the left grid of tube 42. Since the frequency divider plate circuits pass current alternately, tubes 52 and 53 will pass current alternately. The grid of tube 53 will be positive for a length of time equal to one complete cycle of the tuning fork oscillator for each cycle of the signaling frequency applied at 45. The square waves S42, Fig. 5, which represent the current through the left section of tube 42, may also represent the grid voltage of tube 53 and the current S53 through this tube, although S42 and S53 are not necessarily of equal magnitude. This current flowing through tube 53 flows in the path represented by the arrows and through resistance 6, and produces an average voltage across 6 proportional to the average current flowing. Since the current pulsations S53 are maintained at a constant value, the average voltage developed across resistance 6 is proportional to the frequency of the signal frequency applied at 45 as explained in connection with Fig. 2. Tube 52 passes current whenever tube 53 is cut off as represented by curve S52, Fig. 5, and thus a steady current is passed through tube 54. The current which flows through tube 52 is by-passed around resistance 6. In effect, current regulator and meter circuit 23, self balancing potentiometer 7, galvanometer 8, and the associated follow-up and indicator apparatus constitute measuring means responsive to the product of the duration of rectangular waveform pulses S42 and their repetition rate.

The steady current through tube 54 is held constant by tube 55, the grid control of which is connected between resistances 56 and 57 included in the steady current circuit. Thus if the current through 54 decreases, the grid voltage of tube 55 will decrease, causing its plate voltage to rise, which in turn raises the grid voltage of tube 54, allowing it to pass more current. The magnitude of the current flow may be calibrated by adjustment of the resistance at 64. The tubes 52—53 correspond in some respects to the two-way switch 3, Fig. 1.

It is thus seen that the magnitudes of the measurement current pulsations are of a constant value. These pulsations are essentially of square wave form so variations in tube characteristics cannot alter their shape. The pulses are held at a constant duration or length by the standard frequency tuning fork oscillator, and their number during a given length of time is proportional only to the frequency to be measured. Accuracy of a high order is therefore assured.

The slide wire potentiometer 7 is connected across the constant plate supply voltage 30—31, and the null instrument 8 is connected between its adjustable brush and a point along resistance 6, depending upon the position of selector switch 46, which has four measurement positions for different speed ranges. It will be assumed that for measuring speed, the signal frequency O45 is produced by a four-pole synchronous tachometer generator driven at the speed to be measured, and that the position of range switch 46, Fig. 4, is for a measurement speed range from 0 to 30,000 R. P. M. Moving the range switch one step clockwise gives a speed range from 0 to 15,000 R. P. M. The next step gives a speed range from 0 to 6,000 R. P. M., and the fourth or last measurement step gives a speed range from 0 to 3,000 R. P. M. The switch 46 has a fifth position where the instrument 8 remains connected for the 0 to 3,000 R. P. M. range but where the signal frequency O45 is disconnected. Thus when on contact 58, the selector switch disconnects the signal frequency terminals 45 from amplifier 19 and connects amplifier 19 to the plate power supply. This is done before the apparatus is to be used to warm up the tubes. The selector switch has a sixth position corresponding to contact 59. In this position the signal frequency O45 is disconnected from amplifier 19, and the standard frequency from the tuning fork oscillator is connected in its place through a connection 60. Also a circuit containing resistances 61 and 62 is connected in parallel with the 0–3,000 range portion of resistance 6 through a range switch contact 63. This connection is for calibration purposes, using the standard frequency from the tuning fork oscillator 16 in place of the frequency from 45. Owing to the manner in which the electronic circuits operate, not every cycle from the tuning fork oscillator fed through amplifier 19 will be counted but every second cycle will be, so that the operation is the same as it would be if a frequency one-half that of the oscillator 16 were applied to amplifier 19. The resistance 61—62 used to reduce the measurement voltage at this time is adjusted to such value as to give a measurement voltage corresponding to 30,000 R. P. M. or 1,000-cycle signal frequency. Thus the apparatus may be calibrated using the frequency standard 16. The adjustable resistance at 15 is used for zero adjustment. In series with the galvanometer 8 is an adjustable antihunt generator 67 employed to reduce overshoot and undershoot of instrument 8.

The photoelectric follow-up control indicated at 25 in Fig. 3, but not represented in Fig. 4, may be of the type described in United States Patent No. 1,897,850 to LaPierre, February 14, 1933.

Associated with the various electronic circuits employed in the complete commercial equipment over one hundred circuit elements comprising resistances and condensers are employed. The values recommended for these circuit elements as well as the commercial designations of the tubes recommended may be found in a publication of General Electric Company, Schenectady, New York, publication GEI-20858A, entitled "Instructions—Precision Tachometer," Catalog No. 6,933,954G1, first published in 1945.

What I claim as new and desire to secure by Letters Patent of the United States is:

1. Frequency measuring apparatus comprising a source of standard frequency, a measurement source of lower frequency, a direct current source, a direct current circuit having a measuring branch and a branch in shunt to the measuring branch connected to be supplied from said direct current source at a constant value of current, electronic switching means for directing the flow of the constant value of direct current either through said measuring branch or through the shunt branch, a frequency divider circuit connected in series with said direct current circuit under the the joint control of said standard and measurement frequencies connected to operate said switching means, means connecting the source of standard frequency in triggering relation to the frequency divider circuit so that the frequency divider circuit provides to the switching means rectangular waveform pulses each having a duration equal to one cycle of the standard frequency, bias control means connected to condition the frequency divider circuit to be responsive or non-responsive selectively to triggering, means connected in responsive relation to said measurement source and in operating relation to said bias control means to set the bias control means for responsive conditioning of the frequency divider circuit once each cycle of the measurement frequency, and means connected in responsive relation to said frequency divider circuit and in operating relation to said bias control means to reset the bias control means for non-responsive conditioning of the frequency divider circuit upon the termination of each rectangular waveform pulse so that the constant direct current flows in the measuring branch only once for each cycle of the measurement frequency and for a period of time equal to the length of one cycle of the standard frequency.

2. Frequency measuring apparatus comprising a source of standard frequency, a direct current source, a direct current circuit supplied at constant current from the direct current source and having a measuring circuit branch and a branch in shunt thereto, an electronic switch which directs the constant direct current either through the measurement circuit branch or the shunt branch, means responsive to the standard frequency source for producing negative impulses once per cycle of such frequency, means responsive to a source of frequency to be measured which frequency is lower than the standard frequency for producing positive impulses once per cycle of the frequency to be measured, and an electronic frequency divider circuit operated in response to the joint control of such negative and positive impulses for controlling said electronic switch such that the switch is operated to direct the constant direct current through the measurement branch once for each cycle of the measurement frequency and for a duration equal in length to one cycle of the standard frequency.

3. Frequency measuring apparatus comprising a constant current direct current circuit having a measuring branch and a branch in shunt to the measuring branch, an electronic switch for directing the constant current either through the measuring branch or the shunt branch, an electronic frequency divider circuit for controlling the operation of said switch, means for impressing on the frequency divider circuit sharp impulses of alternating polarity at a standard frequency, a source of frequency to be measured and means responsive thereto for impressing on the frequency divider circuit a prolonged impulse of one polarity for each cycle of the frequency to be measured, said frequency divider circuit being responsive only to those standard frequency sharp impulses which are of a given polarity during such prolonged impulses, the first such polarity sharp impulse occurring during a prolonged impulse operating the electronic switch to convey the constant current through the measuring branch and the second such sharp impulse operating the electronic switch to convey the constant current through the shunt branch, and other electronic means operating in response to such second sharp impulses for interrupting the prolonged impulses.

4. In frequency measuring apparatus, the combination of an electronic switch and means for controlling said switch so it corresponds to a measurement position only for a constant time period once each cycle of the frequency to be measured, said means comprising a source of standard frequency having a value at least three times the maximum value of the frequency to be measured, means connected in responsive relation to said standard frequency source for producing sharp negative impulses at the standard rate of one per cycle of such frequency, an electronic frequency divider circuit connected for operation responsive to triggering by such sharp negative impulses for determining the beginning and ending of measurement position time periods of said electronic switch, biasing means having terminals for connection in responsive relation to the frequency to be measured and connected to impress prolonged positive bias impulses on said frequency divider circuit for permitting its operation and the operation of the electronic switch to measurement position once per cycle of the measurement frequency, said biasing means including an electronic snap circuit which initiates such prolonged impulses once per cycle in response to the frequency to be measured, and a reset circuit connected in responsive relation to said frequency divider circuit and in operative relation to said biasing means which interrupts such prolonged impulses in response to the operation of the frequency divider circuit at the termination of such time periods.

5. In a frequency measuring system, the combination of an electronic switch and means for controlling said switch so that it corresponds to a measurement position only for constant time periods once per cycle of the frequency to be measured, said means comprising a standard frequency source and electronic means connected to be controlled thereby for producing sharp impulses of a given polarity at a standard rate, bias control electronic means having terminals for connection in responsive relation to the frequency to be measured for producing prolonged impulses once per cycle of the latter frequency, an electronic frequency divider circuit connected to be triggered by the sharp impulses and to control the operation of said electronic switch, means connecting said bias control means in biasing relation to said electronic switch so that said switch is responsive to the sharp impulses only during the prolonged impulses, the prolonged impulses determining the frequency of operation of the electronic switch and the two consecutive sharp impulses occurring during a prolonged impulse determining the beginning and ending of the measurement position time periods of the electronic switch, and a reset circuit connected to be responsive to such time period terminating operations of said electronic switch and connected in operating relation to said bias control means for also terminating the corresponding prolonged impulses.

6. A frequency measuring system comprising a direct current measuring circuit, a regulated source of supply for producing a constant direct current in said circuit, a circuit in shunt to said measuring circuit, an electronic switch for shifting the flow of said constant direct current from the measuring circuit to the shunt circuit and vice versa, and means for controlling the operation of said electronic switch so that the constant current flows in the measuring circuit only once per cycle of the frequency to be measured for a constant time period which is less in duration than one third cycle of the maximum frequency to be measured, the constant current flowing in the shunt circuit during the remainder of the time, said means including a high accuracy oscillator for producing a standard frequency, means responsive to such frequency for producing sharp impulses of a given polarity at a corresponding frequency, means responsive to the frequency to be measured for producing one prolonged impulse for each cycle of the latter frequency, electronic means controlled jointly by said impulses for controlling the operation of said electronic switch, said last-mentioned means being operative for this purpose only during the prolonged impulses, the first such sharp impulse occurring during a prolonged impulse determining the beginning of the aforesaid constant time period and the second such sharp impulse determining the ending of such constant time period, means controlled in response to such second sharp impulse during a prolonged impulse for terminating such prolonged impulse, and means for causing the operation of the prolonged impulse producing means to be responsive to the frequency of the high accuracy oscillator instead of to a frequency to be measured for the purpose of calibrating said frequency measuring apparatus.

7. In frequency-measuring apparatus, including a voltage supply and operating means to provide rectangular waveform pulses of uniform duration having a repetition rate proportional to the measured frequency, the combination of a constant current circuit having a portion including a measuring circuit branch and a shunt circuit branch in parallel and a common portion in series with both branches, connections to the voltage supply to provide an electric current through said constant current circuit, a current regulator connected in said common portion to maintain the total electric current through the constant current circuit at a constant value independent of changes in impedance of the circuit elements, switching means connected in said constant current circuit to direct such current through one or the other of the parallel circuit branches selectively, connections joining the operating means in operating relation to said switching means so that current is directed through the measuring circuit branch pulses, and measuring means connected to said measuring circuit branch and responsive to the average value of current through such branch.

HOWARD L. CLARK.

REFERENCES CITED

The following references are of record in the file of this patent:

UNITED STATES PATENTS

| Number | Name | Date |
|---|---|---|
| 2,119,389 | Hunt | May 31, 1938 |
| 2,161,146 | Echlin | June 6, 1939 |
| 2,295,118 | Le Clair | Sept. 8, 1942 |
| 2,325,927 | Wilbur | Aug. 3, 1943 |
| 2,352,082 | De Rosa | June 20, 1944 |
| 2,366,076 | Wilbur | Dec. 26, 1944 |
| 2,405,597 | Miller | Aug. 13, 1946 |

FOREIGN PATENTS

| Number | Country | Date |
|---|---|---|
| 355,705 | Great Britain | Aug. 24, 1931 |

OTHER REFERENCES

Electronic Industries, March 1945, pages 80, 81, 208.

Certificate of Correction

Patent No. 2,476,025                                                          July 12, 1949

HOWARD L. CLARK

It is hereby certified that errors appear in the printed specification of the above numbered patent requiring correction as follows:

Column 6, line 17, for "O42" read *S42*; column 12, line 35, after "branch" insert *only during such rectangular wave form*;

and that the said Letters Patent should be read with these corrections therein that the same may conform to the record of the case in the Patent Office.

Signed and sealed this 14th day of March, A. D. 1950.

[SEAL]

THOMAS F. MURPHY,
                                                                        *Assistant Commissioner of Patents.*